United States Patent [19]

Reinwall

[11] Patent Number: 4,621,963
[45] Date of Patent: Nov. 11, 1986

[54] FASTENER FOR ROOF ASSEMBLIES AND THE LIKE

[75] Inventor: Ernest W. Reinwall, McHenry, Ill.

[73] Assignee: Elco Industries, Inc., Rockford, Ill.

[21] Appl. No.: 593,129

[22] Filed: Mar. 26, 1984

[51] Int. Cl.$^4$ ............................................. F16B 33/00
[52] U.S. Cl. ................................... 411/369; 411/386; 411/411; 411/412; 411/424; 52/474; 52/520
[58] Field of Search ............... 411/386, 412, 415, 369, 411/413, 417, 424, 426, 411, 389; 52/474, 520, 506, 173 R

[56] References Cited

U.S. PATENT DOCUMENTS

| | | |
|---|---|---|
| 65,651 | 1/1867 | Davies .................................. 411/415 |
| 470,804 | 3/1892 | Jones ................................... 411/424 |
| 2,169,408 | 8/1939 | Vellier ................................. 411/412 |
| 3,478,639 | 11/1969 | Gruca ................................. 411/387 |
| 3,524,378 | 8/1970 | Wieber ............................... 411/387 |
| 3,537,288 | 11/1970 | Ansingh ............................... 72/88 |
| 3,682,507 | 8/1972 | Waud ................................ 52/173 R |
| 3,882,756 | 5/1975 | Sauer et al. ..................... 411/426 X |
| 3,894,570 | 7/1975 | Reynolds ............................. 411/133 |
| 4,004,483 | 1/1977 | Hallock .............................. 411/386 |
| 4,028,987 | 6/1977 | Wilson ............................... 411/387 |
| 4,096,901 | 6/1978 | Reichenbach .................. 411/389 X |
| 4,179,976 | 12/1979 | Sygnator ............................. 411/413 |
| 4,258,607 | 3/1981 | McKewan ........................... 411/417 |
| 4,275,541 | 6/1981 | Orals et al. ..................... 411/387 X |
| 4,453,361 | 6/1984 | Hulsey ............................ 411/386 X |

FOREIGN PATENT DOCUMENTS

| | | |
|---|---|---|
| 2423410 | 11/1975 | Fed. Rep. of Germany ...... 411/446 |
| 2805071 | 9/1978 | Fed. Rep. of Germany ...... 411/389 |
| 414026 | 12/1946 | Italy .................................... 411/424 |
| 9372 | of 1890 | United Kingdom ................. 411/424 |

Primary Examiner—Gary L. Smith
Assistant Examiner—Rodney M. Lindsey
Attorney, Agent, or Firm—Leydig, Voit & Mayer, Ltd.

[57] ABSTRACT

A fastener for securing a sheet metal roof panel to a roof frame with a layer of compressible insulation between the two includes an elongated shank with a tip at one end and a driving head at the other. The shank either is inserted tip first through a preformed hole in the sheet or through a hole which the tip drills and the shank is driven through the insulation layer. A first thread on the shank adjacent the tip is driven into the frame and draws a flared portion of the shank through the hole to enlarge the latter and roll over the metal around the edge of the hole. The rolled over edge then is engaged by a second thread on an enlarged portion of the shank under the head and the plate together with a washer are compressed between the second thread and the head so as to prevent overdrive of the fastener and reduce the possibility of the sheet being dimpled. Longitudinally extending beads or a third thread on the flared portion produce a smooth and gradual rolling over of the edge of the hole in the plate.

2 Claims, 6 Drawing Figures

U.S. Patent  Nov. 11, 1986  4,621,963
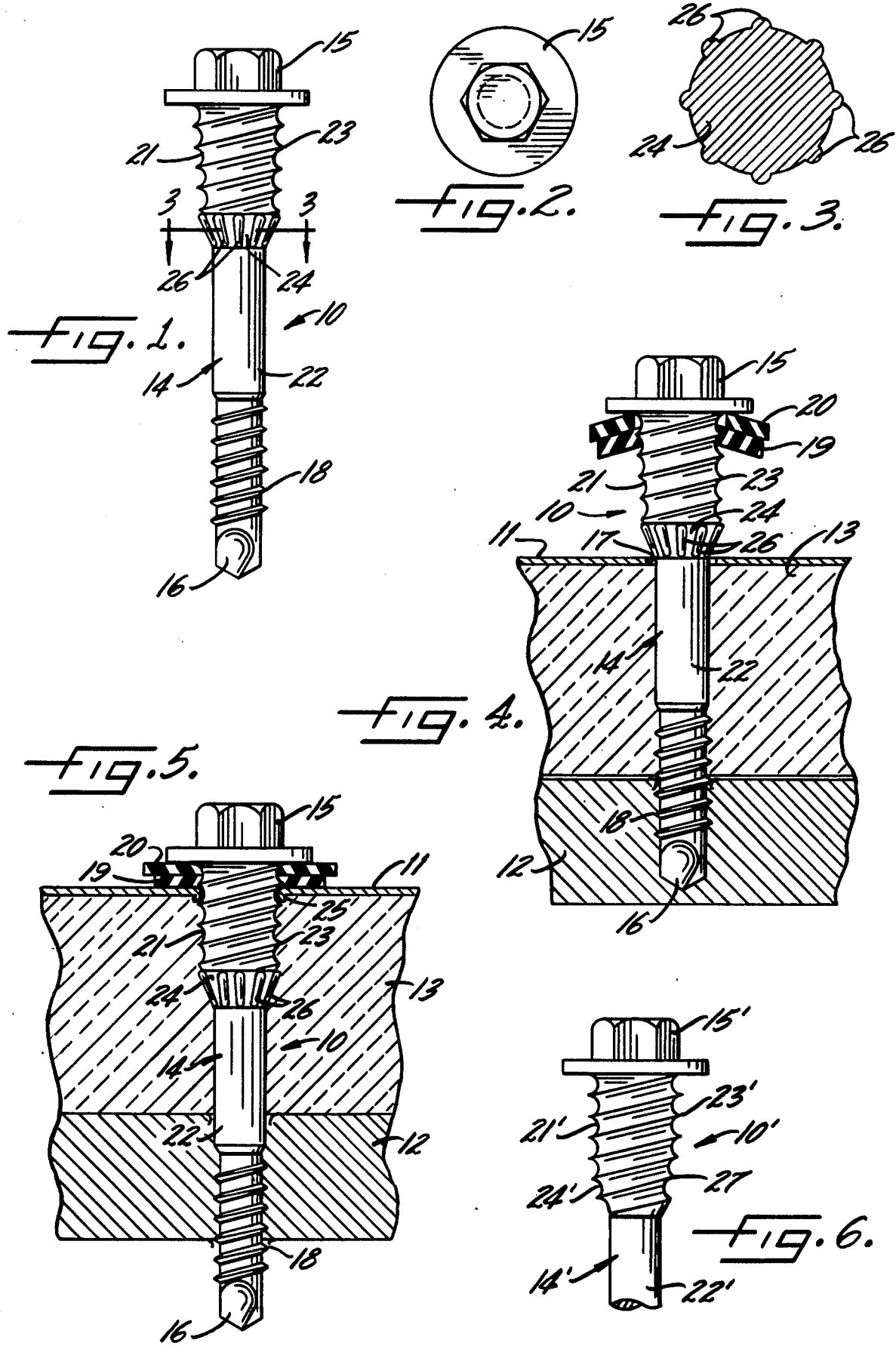

FASTENER FOR ROOF ASSEMBLIES AND THE LIKE

BACKGROUND OF THE INVENTION

This invention relates to a fastener for securing two parts in spaced relation such as a sheet metal roof panel to a roof frame with a layer of insulation between the panel and the frame. The fastener includes an elongated shank with a tip at one end and a driving head at the other and the shank is inserted tip first through a hole, which may be either preformed in the panel or drilled by the tip, and is driven through the insulation layer. A thread formed on the shank adjacent the tip is driven into the frame to draw the head down. A washer on the shank beneath the head is compressed between the head and the panel to provide a seal around the shank at the hole in the panel. Prior fasteners of this type have presented a number of drawbacks among which are that the fastener may easily be overdriven, there is difficulty in obtaining and keeping a good seal between the washer and the plate, and the panel is readily subject to dimpling when exposed to external forces such as roof traffic.

SUMMARY OF THE INVENTION

The general object of the invention is to provide a new and improved fastener of the foregoing type which prevents overdrive, reduces the possibility of the panel dimpling and provides a positive locking and holding of the panel against the washer.

A more detailed object is to provide the shank of the fastener with a flared portion which is drawn through and enlarges the hole in the panel as the thread adjacent the tip is driven into the frame and to form an enlarged threaded portion on the shank between the flared portion and the head so that the flared portion rolls the edge around the hole over and this edge then engages the thread on the enlarged portion to positively support the panel as the driving of the fastener is completed.

Still another object is to form the flared portion of the shank with protuberances which produce a smooth and gradual rolling over of the edge of the hole.

The invention also resides in the relationship of the pitches of the thread at the tip and the thread on the enlarged portion of the shank.

BRIEF DESCRIPTION OF THE DRAWINGS

FIG. 1 is an elevational view of a fastener embodying the invention.

FIG. 2 is a top view.

FIG. 3 is an enlarged sectional view taken along the line 3—3 in FIG. 1.

FIG. 4 is a sectional view of the fastener as it is being driven into a roof assembly.

FIG. 5 is a view similar to FIG. 4 but showing the fastener fully driven.

FIG. 6 is a fragmentary elevational view of a modified form of fastener embodying the invention.

DETAILED DESCRIPTION OF THE PREFERRED EMBODIMENTS

As shown in the drawings for purposes of illustration, the invention is embodied in a fastener 10 for securing a thin sheet of metal roof panel 11 to a roof frame 12 with a layer 13 of compressible insulation between the two. The fastener includes an elongated shank 14 with an enlarged driving head 15 formed on one end and a drilling tip 16 on the other. The shank is inserted tip first through a hole 17 (FIG. 4), which is either punched or drilled by the tip 16, and the shank then is driven through the layer of insulation. A thread 18 formed on the shank adjacent the tip is driven into the frame to fasten the roof parts together. One or more washers 19 and 20 encircling the shank beneath the head 15 are seated against the top of the roof plate to seal the latter around the hole 17.

The present invention contemplates the provision of a novel fastener 10 which provides a comparatively high drive torque so as to prevent overdrive of the fastener and thereby reduce the possibility of panel 11 dimpling against the compressible layer 13 of insulation. In addition, the novel fastener provides a positive locking and holding of the panel against the washer 19 so that the panel and the washer will remain in contact when exposed to external forces such as roof traffic. To these ends, the portion 21 of the shank 14 beneath the head 15 is made larger in diameter than the portion 22 adjacent the tip 16, that is, the portion on which the thread 18 is formed, and a second thread 23 with a concavely radiused root is formed on the shank portion 21. Between the portions 21 and 22 is a flared portion 24 which tapers outwardly from the diameter of the smaller portion 22 to the diameter of the larger portion 21. The portion 22 is no larger in diameter than the original size of the hole 17 while the portion 21 is larger so that the flared portion 24 enlarges the hole as the thread 18 is driven into the frame 12 and the metal around the hole is rolled over and received in the concavely radiused root of the thread 23. As a result, the portions 22 and 21 of the shank are driven together through the frame 12 and panel 11 respectively and, when the fastener is fully driven, the panel is held up against the washer 19 by the thread 23.

Herein, the length of the smaller shank portion 22 from the outer end of its thread 18 to the beginning of the flared portion 24 is greater than the space between the frame 12 and the panel 11, that is, greater than the thickness of the insulation layer 13. In this way, the thread engages the frame before the flared portion engages the panel as illustrated in FIG. 4 whereby the thread is effective to pull the flared portion down through the hole 17. Preferably, the pitch of the thread 23 on the portion 21 is the same as the pitch of the thread 18 so that, as they are threaded into the panel and the frame respectively, the initial spacing of the panel above the frame is maintained even while the fastener is being tightened to compress the washers 19 and 20 between the panel and the head 15. In this way, the novel fastener can produce a tight seal around the hole 17 and also reduces the likelihood of dimpling of the panel.

According to a more detailed aspect of the invention, the surface of the flared portion 24 of the fastener 10 is given a novel shape to produce, as indicated at 25 in FIG. 5, a smooth rolling over of the metal of the panel 11 around the hole 17 as the latter is enlarged by the flared portion. Thus, this surface is formed with a plurality of protuberances which cooperate with the spaces in between to produce the rolled edge 25. In the form illustrated in FIGS. 1-5, the protuberances are a plurality of elongated beads 26 extending generally longitudinally of the fastener and substantially throughout the length of the flared portion, the beads being equally spaced angularly around the surface of the latter. The beads are tapered to be narrow adjacent the shank portion 22 and to become gradually wider toward the portion 21 and the edges of the beads are rounded. Thus, the metal around the hole 17 is repeatedly engaged by the leading edges of the beads which progressively advance through the hole and thus the beads gradually roll the metal over around the hole until the rolled metal edge 25 is engaged by the thread 23.

In the modification illusrated in FIG. 6 in which corresponding parts are indicated by the same but primed reference characters, the protuberances on the flared portion 24' of the fastener 10' are the successive convolutions of a tapered thread 27 extending upwardly from the shank portion 22'. The thread 27 has the same pitch as the thread 23' and merges with the latter at the intersection of the shank portions 21' and 24'. Thus, as the small diameter thread is driven into the frame 12, the edge of the hole 17 is engaged by the tapered thread 27 which progressively rolls the edge over until it is engaged by the thread 23'.

It will be observed that, with the thread 23 engaging the panel 11 while the thread 18 is being driven into the frame 12, the fastener 10 maintains the spacing between the panel and the frame and this spacing is held after the fastener has been fully driven. With the threaded drive between the fastener and the panel, the panel and the washers 19 and 20 are clamped between the head 15 and the thread 23 so that the washers are compressed against the panel by this clamping action rather than being pulled down against the panel by the thread 18 entering the frame 12. In this way, overdrive of the fastener is prevented and possible dimpling of the panel is reduced. In addition, the beads 26, or the flared thread 27, produces a smooth rolled over edge 25 around the hole 17 with this edge becoming engaged with the thread 23 to support the panel firmly on the latter.

I claim:

1. The combination of, a sheet of metal, a frame member, and a fastener for securing said sheet to said frame member in spaced relation to the latter, said combination being characterized in that said fastener comprises an elongated shank, a tip formed on one end of said shank, a driving head formed on the other end of said shank, said fastener projecting tip first through a hole of predetermined diameter in said sheet, said shank having a first portion extending from said tip toward said head and being of a diameter smaller than said predetermined diameter, a first thread formed on said first portion of said shank adjacent said tip and threaded into said frame member, said shank having a second portion beneath said head and having a third portion connecting said first and second portions, a plurality of elongated beads formed on and spaced angularly around said third portion and extending longitudinally of said shank, said beads being rounded at their sides and tapered longitudinally with their narrow ends adjacent said first portion and their wide ends adjacent said second portion, said second portion being larger in diameter than said first portion and said third portion being tapered to flare outwardly from said first portion to said second portion, and a second thread formed on said second portion, the root of said second thread being concavely radiused, the length of said first portion from the beginning of said first thread to said third portion being greater than the space between said sheet and said frame member whereby said third portion is drawn down through said hole as said first portion is threaded into the frame member and thereafter said second portion is threaded into the hole, the metal of said sheet being smoothly rolled over around said hole by said third portion and being received in the concavely radiused root of said second thread.

2. The combination of, a sheet of metal, a frame member, and a fastener for securing said sheet to said frame member in spaced relation to the latter, said combination being characterized in that said fastener comprises an elongated shank, a tip formed on one end of said shank, a driving head formed on the other end of said shank, said fastener projecting tip first through a hole of predetermined diameter in said sheet, said shank having a first portion extending from said tip toward said head and being of a diameter less than said predetermined diameter, a first thread of predetermined pitch formed on said first portion of said shank adjacent said tip and threaded into said frame member, said shank having a second portion beneath said head and having a third portion connecting said first and second portions, a plurality of elongated beads formed on and spaced angularly around said third portion and extending longitudinally of said shank, said beads being rounded at their sides and tapered longitudinally with their narrow ends adjacent said first portion and their wide ends adjacent said second portion, said second portion being larger in diameter than said first portion and said third portion being tapered to flare outwardly from said first portion to said second portion, and a second thread formed on said second portion and having the same pitch as said first thread, the root of said second thread being concavely radiused, the length of said first portion from the beginning of said first thread to said third portion being greater than the space between said sheet and said frame member whereby said third portion is drawn down through said hole as said first portion is threaded into the frame member and thereafter said second portion is threaded into the hole, the metal of said sheet being smoothly rolled over around said hole by said third portion and being received in the concavely radiused root of said second thread, the axial length of said first thread being greater than the axial length of said second thread whereby said first thread still engages said frame member when said second thread is fully threaded into said hole.

* * * * *